US011005980B1

(12) United States Patent
Lee et al.

(10) Patent No.: US 11,005,980 B1
(45) Date of Patent: May 11, 2021

(54) MOBILE TERMINAL

(71) Applicant: LG ELECTRONICS INC., Seoul (KR)

(72) Inventors: Soyeon Lee, Seoul (KR); Changil Kim, Seoul (KR); Hanphil Rhyu, Seoul (KR); Changwon Yoon, Seoul (KR); Jaewoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 43 days.

(21) Appl. No.: 16/620,785

(22) PCT Filed: Dec. 8, 2017

(86) PCT No.: PCT/KR2017/014371
§ 371 (c)(1),
(2) Date: Dec. 9, 2019

(87) PCT Pub. No.: WO2019/054572
PCT Pub. Date: Mar. 21, 2019

Related U.S. Application Data

(60) Provisional application No. 62/559,644, filed on Sep. 18, 2017.

(51) Int. Cl.
| *H01Q 1/22* | (2006.01) |
| *H04M 1/02* | (2006.01) |
| *H01Q 1/24* | (2006.01) |
| *H01Q 9/04* | (2006.01) |
| *H01Q 21/28* | (2006.01) |

(Continued)

(52) U.S. Cl.
CPC ............ *H04M 1/026* (2013.01); *H01Q 1/243* (2013.01); *H01Q 1/44* (2013.01); *H01Q 9/0464* (2013.01); *H01Q 21/28* (2013.01)

(58) Field of Classification Search
CPC ......... H04M 1/026; H01Q 1/243; H01Q 1/44; H01Q 9/0464; H01Q 21/28
USPC ............................................. 455/566
See application file for complete search history.

(56) References Cited

U.S. PATENT DOCUMENTS

| 2013/0050046 A1* | 2/2013 | Jarvis ................. H01Q 9/145 343/852 |
| 2016/0028148 A1* | 1/2016 | Tan ....................... H01Q 1/22 343/702 |
| 2016/0261050 A1 | 9/2016 | Sharawi et al. | |

FOREIGN PATENT DOCUMENTS

| CN | 1816973 A | 8/2006 |
| CN | 104681946 A | 6/2015 |
| CN | 205005335 U | 1/2016 |

(Continued)

*Primary Examiner* — Lee Nguyen
(74) *Attorney, Agent, or Firm* — Birch, Stewart, Kolasch & Birch, LLP

(57) ABSTRACT

Provided is a mobile terminal comprising: a body: a ground embedded inside the body and having a vertical length longer than a horizontal length; a side case positioned on the periphery of a side surface of the body and comprising a first side member and a second side member positioned on the left and right side surfaces of the body, respectively; a first patch for connecting one end of the first side member and one end of the second side member; a second patch for connecting the other end of the first side member and the other end of the second side member; and a power supply part connected to the second patch, wherein the first side member, the second side member, the first patch, and the second patch from a loop form a loop ring-patch antenna.

13 Claims, 14 Drawing Sheets

(51) Int. Cl.
*H01Q 1/44* (2006.01)
*H01Q 1/48* (2006.01)

(56) References Cited

FOREIGN PATENT DOCUMENTS

| | | |
|---|---|---|
| CN | 105940554 A | 9/2016 |
| CN | 106972246 A | 7/2017 |
| CN | 107069215 A | 8/2017 |
| CN | 206389417 U | 8/2017 |
| JP | 7-303005 A | 11/1995 |
| JP | 2009-89305 A | 4/2009 |
| KR | 10-2005-0013970 A | 2/2005 |
| KR | 10-2012-0052430 A | 5/2012 |
| KR | 10-2016-0066396 A | 6/2016 |
| WO | WO 2012/140662 A1 | 10/2012 |
| WO | WO 2016/034887 A1 | 3/2016 |
| WO | WO 2017/090865 A1 | 6/2017 |

\* cited by examiner

FIG. 8
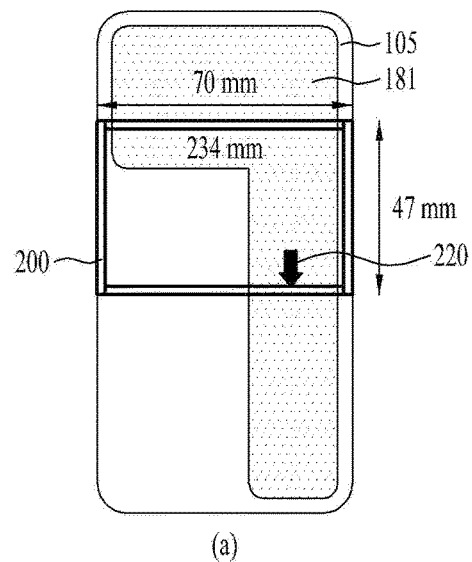
(a)
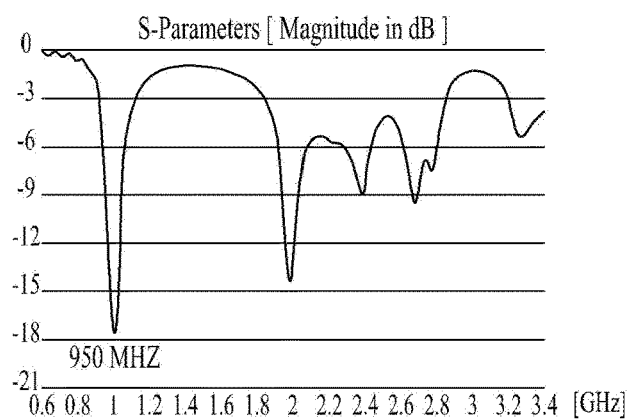
(b)
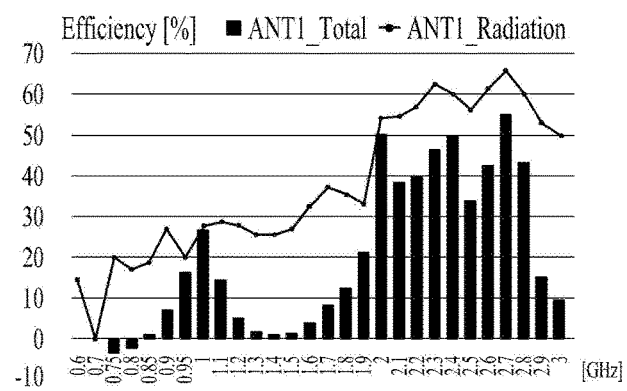
(c)

FIG. 9
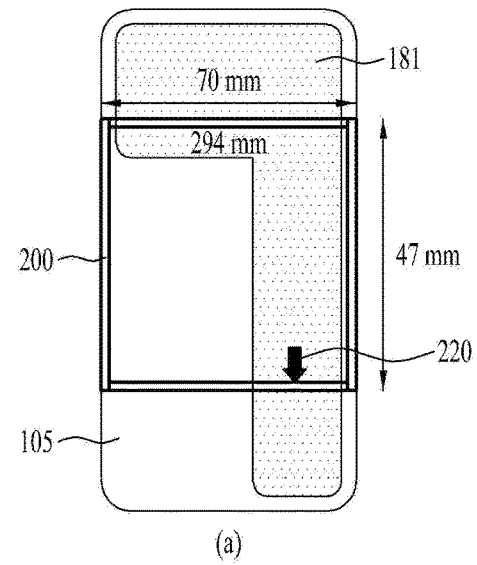
(a)
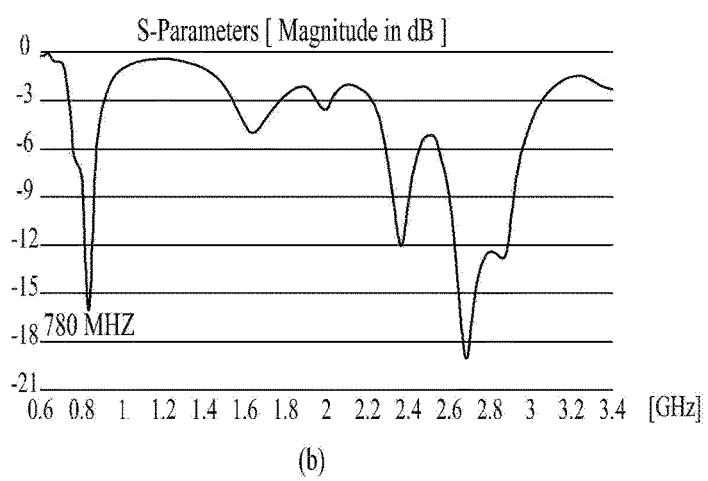
(b)
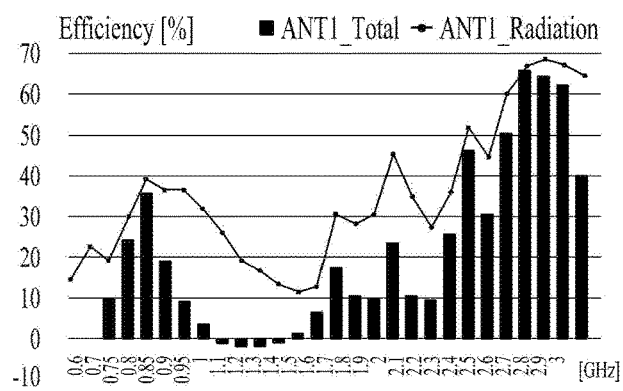
(c)

FIG. 10
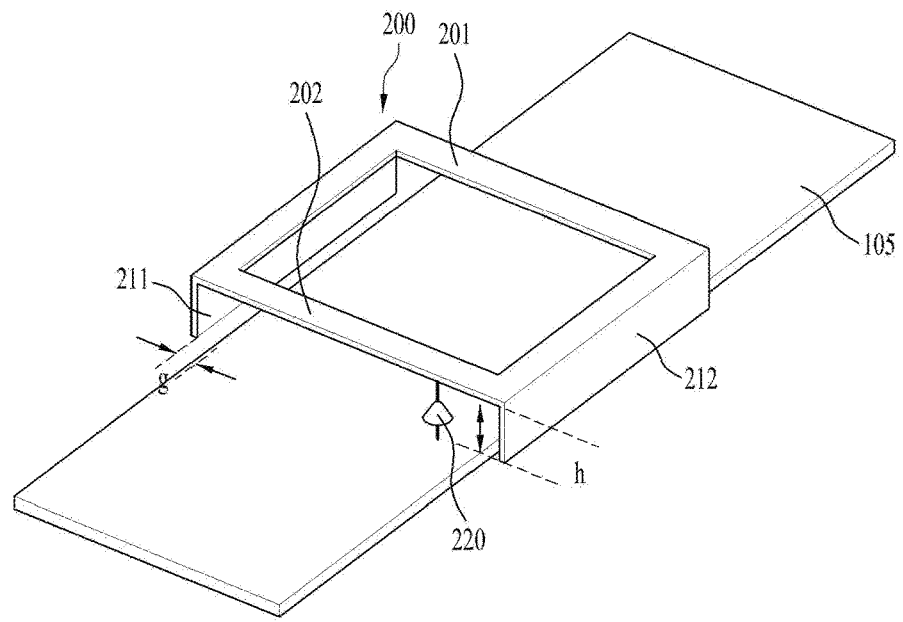
(a)
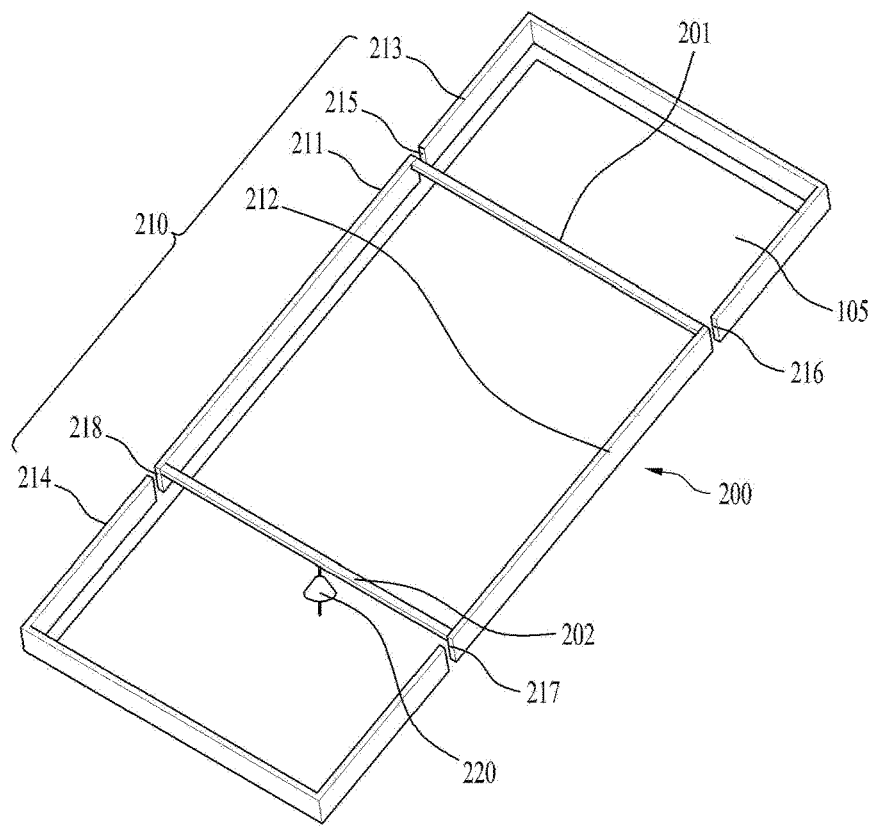
(b)

Ring size (76mm x 70mm)

| 0.9 GHz | Left | Right |
|---|---|---|
| Free [dB] | -4.6 | |
| PDA Hand [dB] | -8.8 | -8.5 |
| Wide Hand [dB] | -10.5 | -11.0 |
| Head [dB] | -10.5 | -11.5 |
| Body [dB] | -20 | -17.5 |

Ring size (32mm x 70mm) + Booster slot

| 0.9 GHz | Left | Right |
|---|---|---|
| Free [dB] | -5.2 | |
| Wide Hand [dB] | -7.7 | -8.0 |
| Head [dB] | -11.0 | -11.5 |
| Body [dB] | -12.2 | -13.0 |

FIG. 13
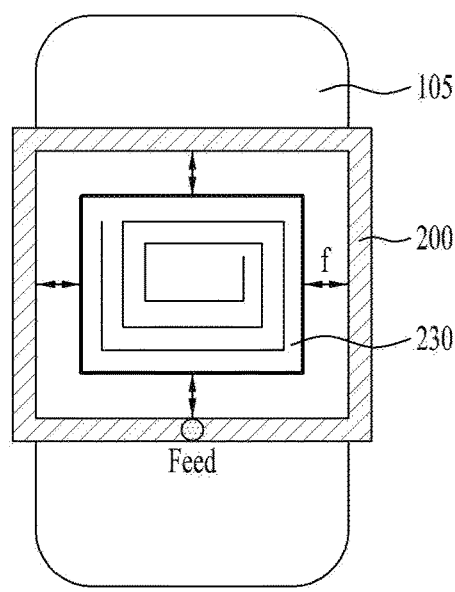
(a)
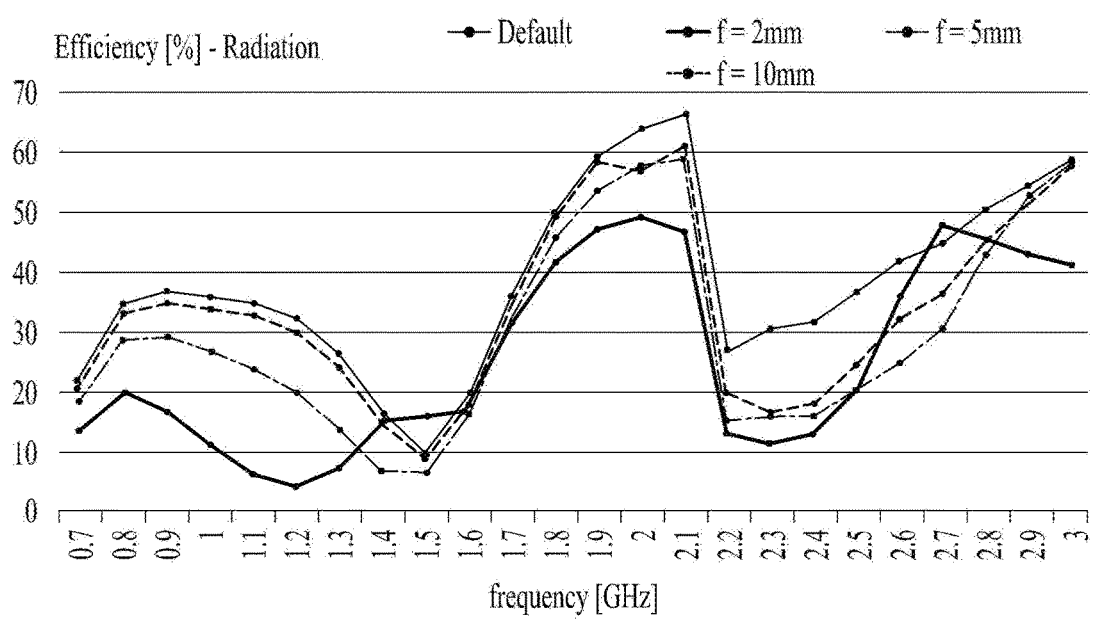
(b)

MOBILE TERMINAL

CROSS REFERENCE TO RELATED APPLICATIONS

This application is the National Phase of PCT International Application No. PCT/KR2017/014371, filed on Dec. 8, 2017, which claims priority under 35 U.S.C. 119(e) to U.S. Provisional Application No. 62/559,644, filed on Sep. 18, 2017, all of which are hereby expressly incorporated by reference into the present application.

FIELD

Embodiments of the present disclosure relate to a mobile terminal which may transceive signals in a low frequency band via a ring patch antenna.

BACKGROUND

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Efforts are ongoing to support and increase the functionality of mobile terminals. Such efforts include software and hardware improvements, as well as changes and improvements in the structural components.

With the diversified functions, various standards of wireless communication techniques are combined to the mobile terminal and a plurality of antennas tends to be loaded in such the mobile terminal. An antenna radiator is arranged in an outer area of the mobile terminal such that it may be attached to a case or formed of some area of the case. In recent, a design of the mobile terminal is becoming common that uses a side case of the mobile terminal as the antenna radiator.

Especially, as a display unit is enlarged in the mobile terminal, the side case becomes close to the display unit. Accordingly, the performance of the antenna arranged in a side surface of the mobile might be deteriorated by the influence of the display unit or a metal plate supporting a rear surface of the display disadvantageously.

DETAILED DESCRIPTION OF THE INVENTION

Technical Problem

To overcome the disadvantages, an object of the present invention is to address the above-noted and other problems and provide a mobile terminal which may transceive signals in a low frequency band via a ring patch antenna.

Technical Solution

To achieve these objects and other advantages and in accordance with the purpose of the embodiments, as embodied and broadly described herein, a mobile terminal comprises a body; a ground loaded in the body and having a vertical length that is longer than a horizontal length; a side case comprising first and side members that are provided in left and right lateral surfaces of the body and arranged around a circumference of the lateral surface of the body; a first patch connecting one end of the first side member and one end of the second side member with each other; a second patch connecting the other end of the first side member and the other end of the second side member with each other; and a feeding portion connected to the second patch, wherein the first side member, the second side member, the first patch and the second patch form a loop-shaped ring patch antenna.

The feeding portion may be located in a middle area of the second patch.

The side case may comprise a third side member having one end facing one end of the first side case and the other end facing one end of the second side case; a fourth side member having one end facing the other end of the first side case and the other end facing the other end of the second side case; and first through fourth slits provided between the first through fourth side members and comprising a non-conductive material, respectively.

The third side member may comprise a boosting slot spaced apart from the ground from one end to a ground portion.

The ring patch antenna may be located in a middle area of the body in a vertical direction.

The vertical length of the ground may be corresponding to a half of the wavelength of the resonance frequency of the ring patch antenna.

The length of the ring patch antenna may be corresponding to the wavelength of the resonance frequency of the ring patch antenna.

The width of the ring patch antenna may be 0.8 mm or more and 2 mm or less.

The mobile terminal may further comprise a rear case provided to cover a rear surface of the body, wherein the first and second patches are attached to an inner surface of the rear case.

The ground may comprise at least one of a display unit disposed on a front surface of the body or a metal plate provided to support a rear surface of the display unit.

The respective first and second patches may comprise a curved portion.

The mobile terminal may further comprise a coil antenna provided in a rear surface of the case and surrounded by the ring patch antenna.

The first and second patches may be spaced a distance of 10 mm or more apart from the coil antenna.

Advantageous Effects

Accordingly, the embodiments have following advantageous effects. According to the embodiments of the present disclosure, the mobile terminal is capable of transceiving a signal in a low frequency band even if a bezel becomes small because of the enlarged display unit.

Furthermore, the mobile terminal is capable of using the middle area that is not used in receiving the antenna in the conventional mobile terminal, so as to expand the antenna installation space.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

FIGS. 8 and 9 are diagrams illustrating antenna performance based on the size of the ring patch antenna according to the present disclosure;

FIG. 10 is a diagram illustrating another embodiment of the ring patch antenna according to the present disclosure;

FIGS. 13 and 14 are diagrams to describe performance in case a coil antenna is loaded in the ring patch antenna.

DESCRIPTION OF SPECIFIC EMBODIMENTS

Figure 1A:
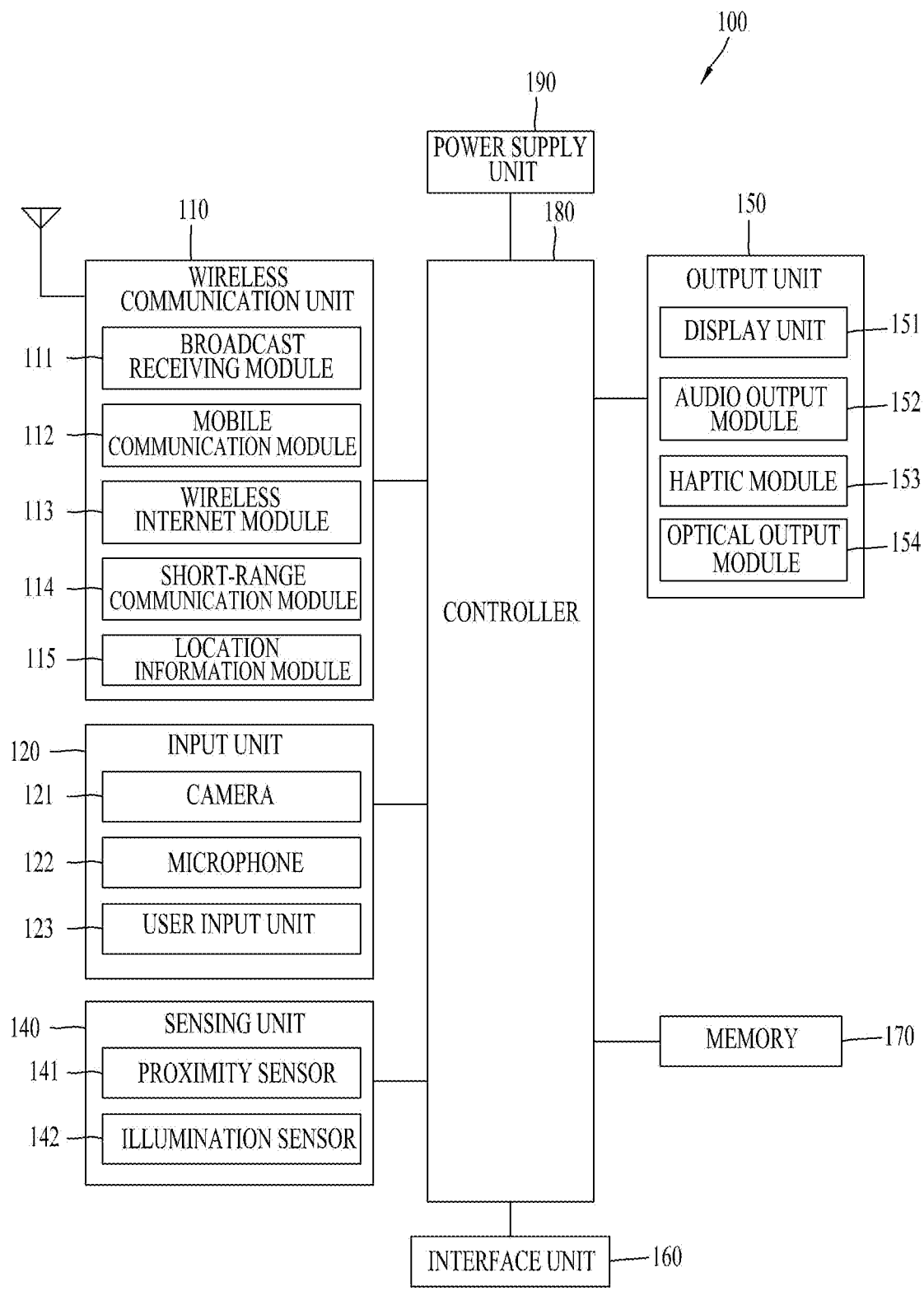
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
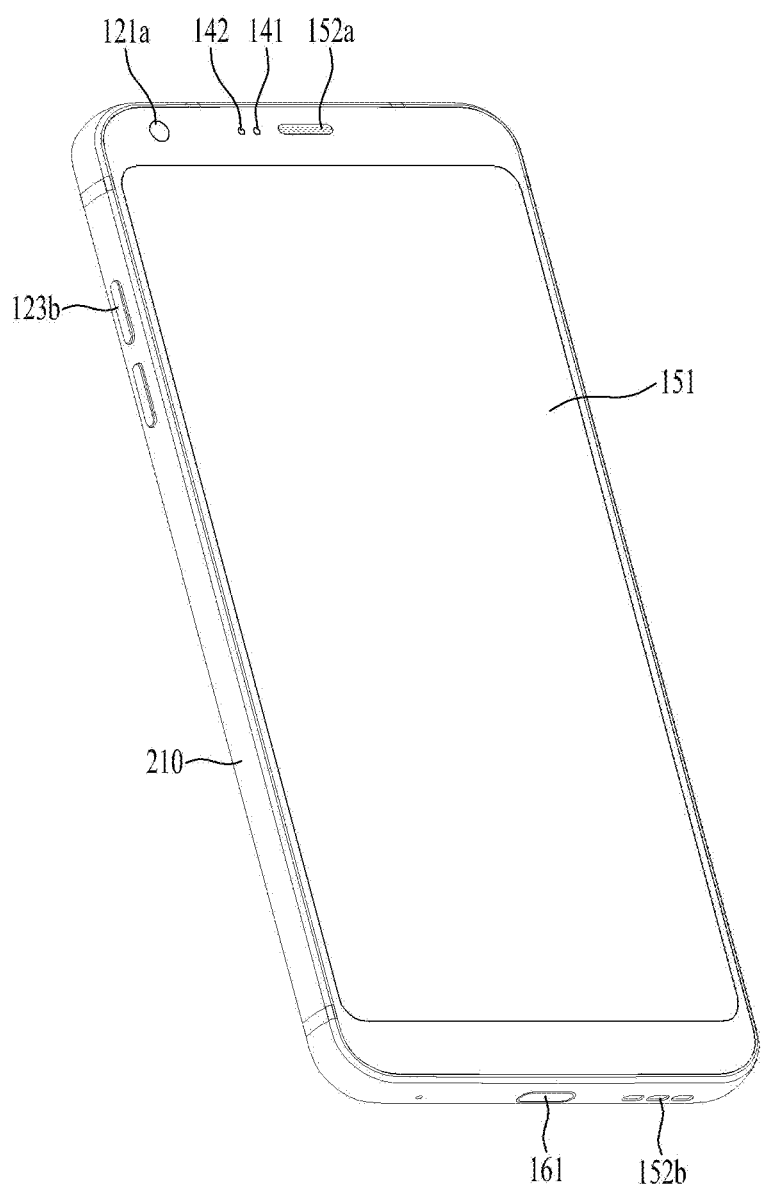
FIGS. 1B and 1C are conceptual views of one example of the mobile terminal, viewed from different directions.
Figure 1C:
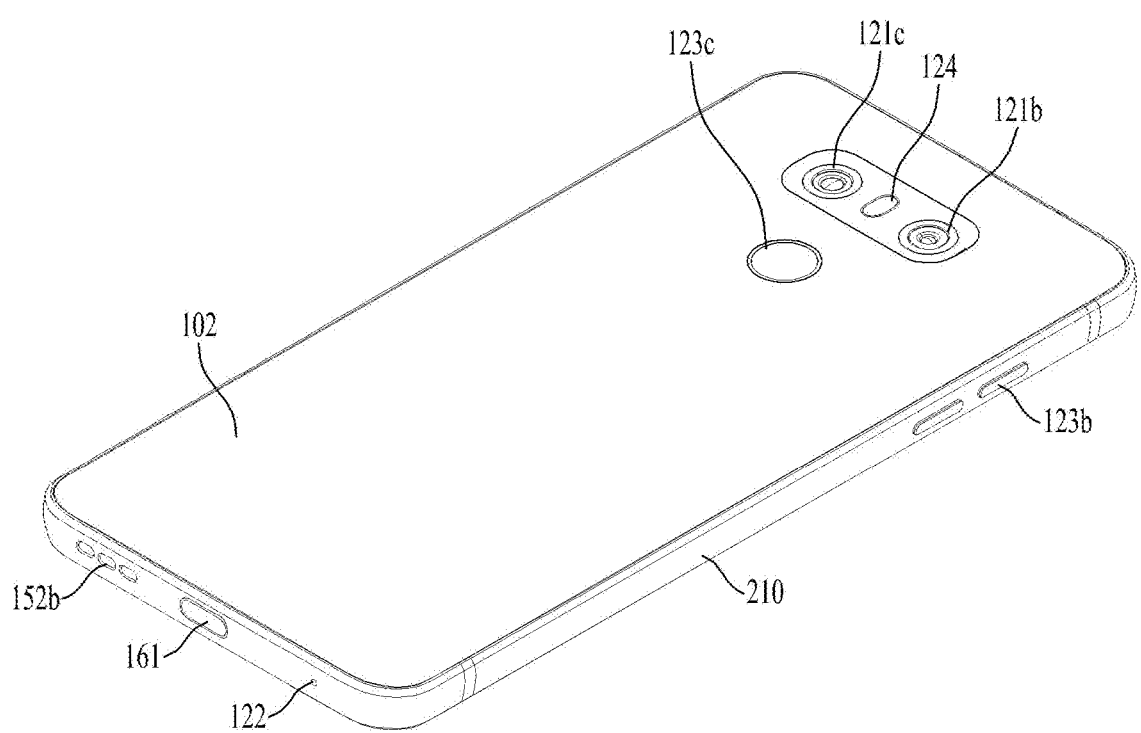

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1A, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170

Hereinafter, referring to FIG. 1, the components mentioned above will be described in detail before describing the various embodiments which are realized by the mobile terminal 100 in accordance with the present disclosure.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 may be provided with the power supplied by an external power source and the power supplied therein under the control of the controller 180 so as to supply the needed power to each of the components. The power supply unit 190 may include a battery. The battery may be a built-in type which is rechargeable and detachably loaded in the terminal to be charged.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to refer to the concept of this bore a mobile terminal (100) to at least one of the aggregate.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

As shown in the drawing, recently is released a mobile terminal that has no front case, while a window 151a disposed on a front surface of the display unit. The mobile terminal may include a side case 210 surrounding a lateral surface. The window 151a, the side case 210 and the rear case 102 may define an inner space. As occasion occurs, electronic components may be loaded even in the rear case 102. The electronic components that could be loaded in the rear case 102 may include a detachable battery, an identification module, a memory card and the like. In this instance, a back cover may be detachably coupled to the rear case 102 to cover the loaded electronic components. Accordingly, the rear cover is detached from the rear case 102 and the electronic components loaded in the rear case 102 may be exposed outside.

Such the cases 102 and 210 may be formed by injection-molding synthetic resin or formed of metal (e.g., Stainless steel (STS), Aluminum (Al), Titanium (Ti) or the like).

The side case 210 according to the present disclosure may include metal to be used as the antenna radiator. For the antenna radiator, a conductive material having a proper length to the characteristics of the frequency of the transceived signal has to be used. Accordingly, a slit 215, 216, 217 and 218 may be provided in a middle area of the metal side case 210 and a non-metallic material may be filled in the slit to space the metal apart there between so as to be used as the antenna radiator.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

The mobile terminal 100 may include the display unit 151, the first and second audio output modules 152a and 152b, the proximity sensor 141, the illuminance sensor 142, the optical output module 154, the first and second cameras 121a and 121b, the first and second manipulation units 123a and 123b, the microphone 122 and the interface unit 160.

It will be described for the mobile terminal as shown in FIGS. 1B and 1C. The display unit 151, the first audio output module 152a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 152b and the second camera 121b are arranged in rear surface of the terminal body.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

Meanwhile, a rear manipulation unit 123c may be provided in a rear surface of the terminal body as another example of the user input unit 123. Such a rear manipulation unit 123c may be configured to be manipulated to receive an input of a command for controlling the operation of the mobile terminal 100. The input contents may be diversely set. As one example, the rear manipulation unit may receive inputs of commands including power On/Off, Start, End or Scroll, volume adjustment of the sound output from the first and second audio output units 152a and 152b, switching into a touch recognizing mode of the display unit 151. The rear manipulation unit 123c may be realized to receive a touch input, a push input or combination of the inputs.

The rear manipulation unit 123c may be overlapped with the display unit 151 disposed on the front surface in a direction along the thickness of the terminal body. As one example, the manipulation unit 123c may be disposed in an upper area of the rear surface of the terminal body to enable the user to easily manipulate the terminal by using the index finger when the user holds the terminal body in one hand. However, the present disclosure is not limited thereto and the position of the rear manipulation unit 123c may be changeable.

When the rear manipulation unit 123c is provided in the rear surface of the terminal body, a new user interface can be realized. Also, the touch screen or rear manipulation unit 123c mentioned above may replace at least some functions of the front manipulation unit provided in the front surface of the terminal body. Unless the front manipulation unit is disposed on the front surface of the terminal body, the display unit 151 may be configured of a more enlarged screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown located adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can be also provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, embodiments related with a control method that can be realized in the mobile terminal having the above-noted configuration will be described, referring to the accompanying drawings. In the present disclosure, that which is well-known to one of ordinary skill in the relevant art has generally been omitted for the sake of brevity.

As shown in FIG. 1b, a distance between the side case 210 and the display unit 151 may become close until 1 mm or less as the display 151 is enlarged. In case of using the side case 210 as the antenna radiator, the display unit 151 including a conductive material (e.g., ITO) might deteriorate the antenna performance disadvantageously. Especially, a low frequency band signal is likely to be affected by peripheral components a lot, because it has a long wavelength. A predetermined length or more of the antenna radiator has to be secured. Accordingly, it is difficult to realize the antenna for the low frequency band signal.

Figure 2:
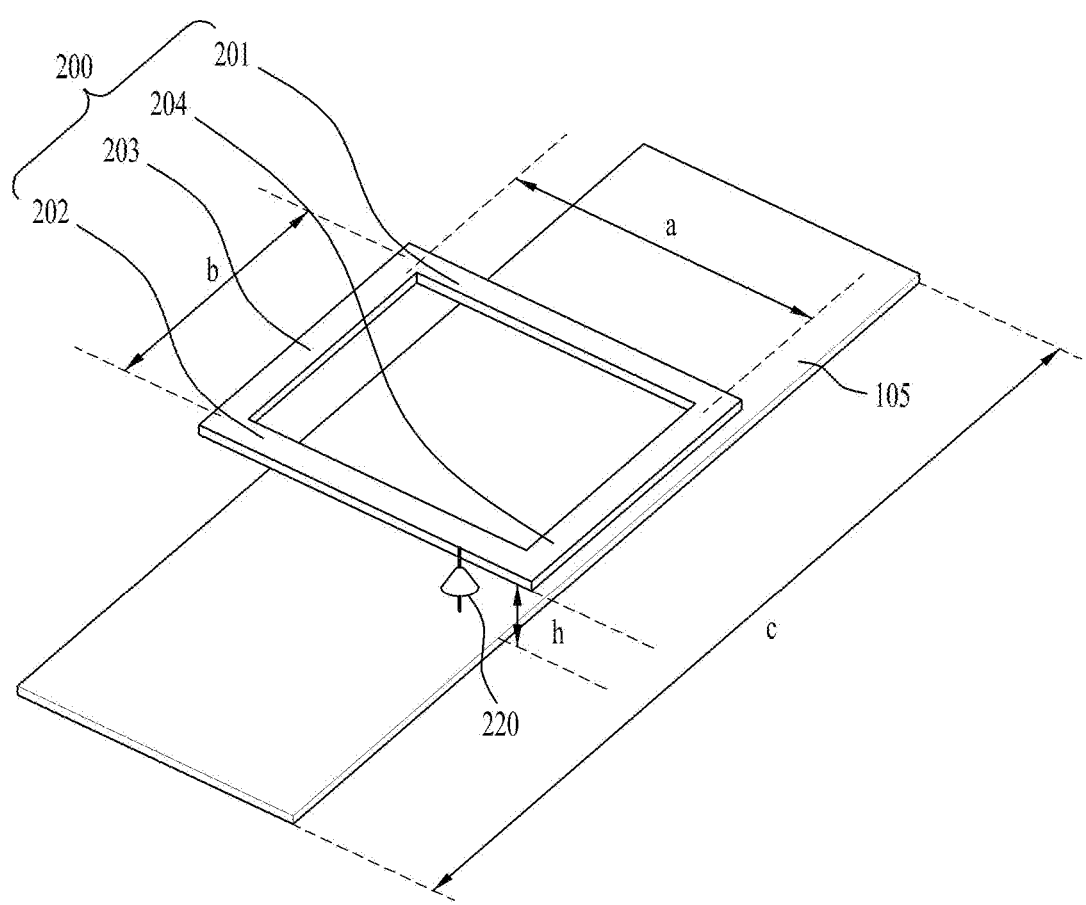
FIG. 2 is a diagram illustrating a ring patch and a metal plate that are provided in a mobile terminal related with the present disclosure.

Therefore, the mobile terminal 100 according to the present disclosure may transceive the low frequency band signal by using a loop-shaped ring patch antennal 200 loaded in the body of the mobile terminal 100. FIG. 2 is a diagram illustrating a ring patch antenna 200 and a metal plate 105 that are provided in the mobile terminal 100 related with the present disclosure.

The metal plate 105 may be provided in a rear surface of the display unit 151 to support the display unit 151 and include metal to secure the strength of the mobile terminal 100. As including the metal, the metal plate 105 may be a conductor having a large area provided in the mobile terminal 100 and may function as a ground.

Even unless it is made of the same material of the metal plate 105, a conductive material (e.g., ITO) may be distributed on the entire area of the display unit 151. In this instance, the display unit 151 may function as the ground 105. Hereinafter, the ground 105 may be not only the metal plate 105 but also the display unit 151. For easy explanation, a numeral reference uses the numeral reference of the metal plate 105.

The mobile terminal 100 according to the present invention may include a rectangular body having a first long direction longer than a second direction. Diverse components may be loaded in the body. The metal plate 105 may be formed of a long plate member having a first direction longer than the second direction like the mobile terminal. In the drawing, a vertical length is longer than a horizontal direction such that the vertical direction may be the first direction and the horizontal direction may be the second direction.

The ring patch antenna 200 has a loop shape and a rectangular shape configured of four linear members as shown in FIG. 2. Or, it may have a curved o bent shape. The ring patch antenna may be partially bent for a relation with the components loaded in the body or for matching resonance frequencies.

The ring patch antenna 200 has to have a corresponding length to the wavelength of the low frequency band signal so as to transceive the low frequency band signal, for example, the minimum length of 200 mm or more. Here, the length of the ring patch antenna 200 means the length of the entire circumference (2a+2b).

The ring patch antenna 200 may be formed shorter according to the thickness thereof or when it becomes closer to peripheral different-shaped components or ground 105. Also, even when the ring patch antenna 200 has to be formed shorter than the wavelength of the transceived signal, a matching element having an inductor or capacitor may be provided in a feeding portion 220 of the ring patch antenna 200 to partially adjust the antenna frequency.

The ring patch antenna 200 may be spaced a preset distance apart from the metal plate 105. Generally, the metal plate 105 may be disposed on a rear surface of the display unit 151 and the ring patch antenna 200 may be attached to or partially forming the case 102, which is an outer area, to radiate a signal.

The ring patch antenna 200 and the metal plate 105 may be spaced a preset distance h apart from each other. Electronic components including a main board, a battery and the like may be loaded between the ring patch antenna 200 and the metal plate 105. The ring patch antenna 200 is more stable than the PIFA antennas loaded in respective upper and lower areas of the mobile terminal 100. Accordingly, even if when is spaced a distance h apart from the ground 105, the ring patch antenna 200 may be above a reference radiation performance value.

The ring patch antenna 200 according to the present disclosure may be located in a center area along a vertical direction of the mobile terminal 100. Referring to FG. 2, the ring patch antenna 200 may have a rectangular shape. Even through it has to have the rectangular shape necessarily, it is preferred that the ring patch antenna 200 is as wide in a horizontal direction as possible so as to gain the long design in a restricted space.

Specifically, the ring patch antenna 200 according to this embodiment may include a first patch 201 and a second patch 202 that are arranged in a horizontal direction; and a third patch 203 and a fourth patch 204 that are expending vertically to be located in respective right and left ends. The first through fourth patches may form a loop. The first through fourth patches 101~104 may have a curved or bent area, while they are not linear necessarily. Viewed in the entire direction, the first patch 201 and the second patch 202 may extend in a vertical direction and the first patch 201 and the second patch 202 may expand in a horizontal direction.

A feeding portion 220 may be connected to the ring patch antenna 200 to radiate a signal. The antenna performance may be different according to the position where the feeding portion 220 is connected to the ring patch antenna 200.

Figure 3:
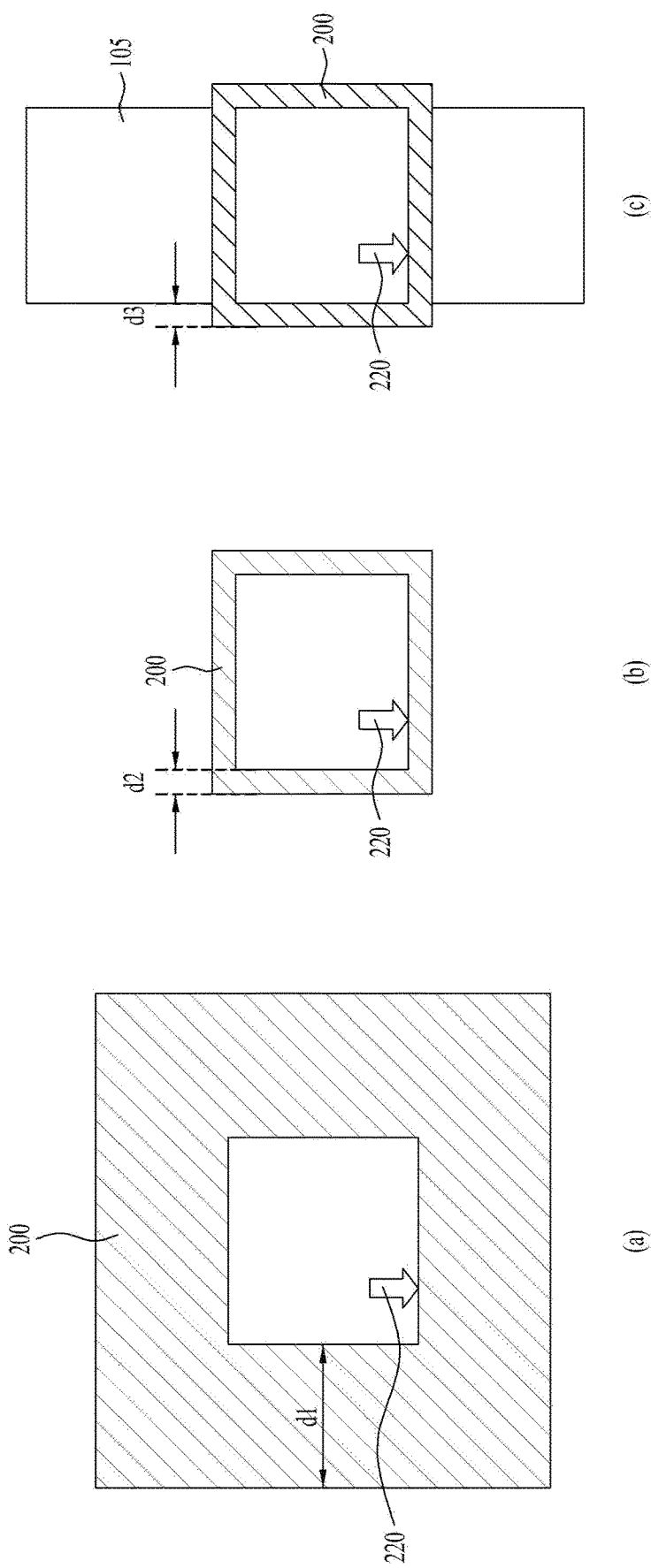
FIG. 3 is a diagram to describe a relation between the ring patch antenna and a ground.
Figure 4:
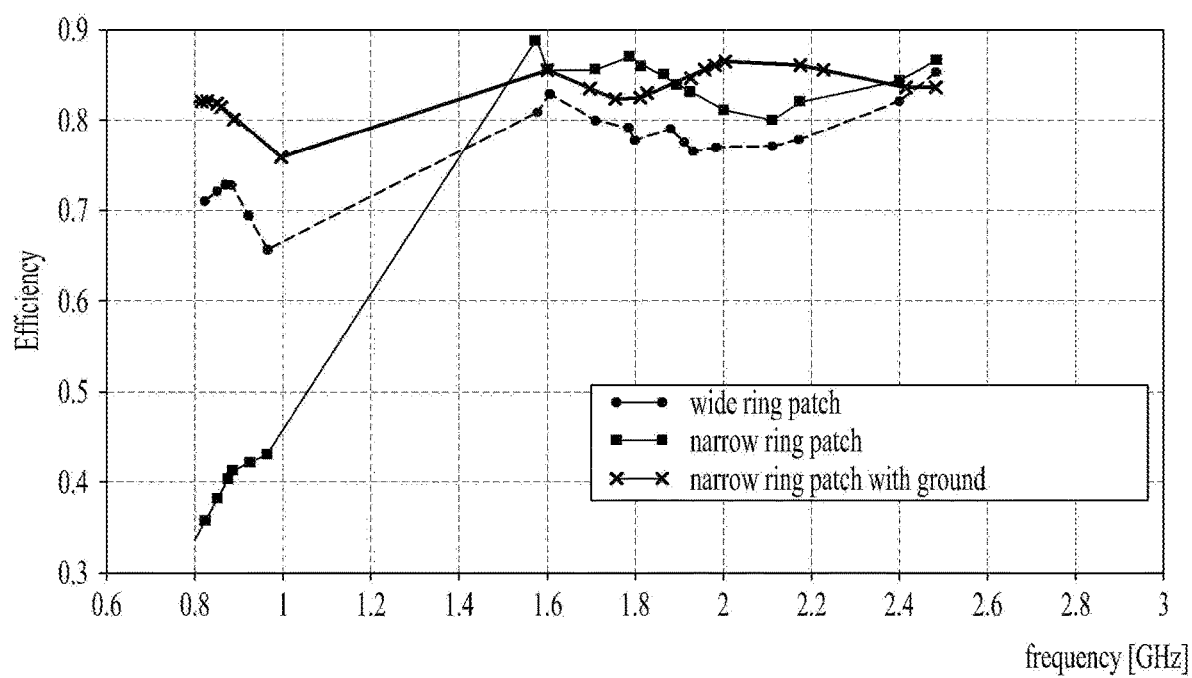
FIG. 4 is a graph illustrating the performance of the ring patch antenna shown in FIG. 3.

FIG. 3 is a diagram to describe a relation between the ring patch antenna and a ground. FIG. 4 is a graph illustrating the performance of the ring patch antenna shown in FIG. 3. When the ring patch antenna 200 is as wide as d1, the ring patch antenna 200 has a good performance in the low frequency band. However, to load such the ring patch antenna 200 in the mobile terminal 200, the width d2 of the ring patch antenna 200 has to be reduced as shown in FIG. 3 (b). When the width of the antenna is reduced, the antenna performance in the low frequency band is likely to disadvantageously deteriorate as shown in FIG. 4.

To solve the antenna performance deteriorated after the size of the ring patch antenna 200 is reduced to load it in the mobile terminal 100, the embodiment of the present disclosure may use the ground 105. When using the ground 105, the transceiving of the low frequency band signal may be supplemented. Accordingly, the similar antenna performance may be secured to the antenna performance gained when a wide ring patch antenna 200 is used as shown in FIG. 4.

The width d3 of the ring patch antenna 200 according to the present disclosure may secure the antenna performance even if it is 2 mm or less. It is difficult to realize a conductive pattern having a width of substantially 0.8 mm or less. Accordingly, the ring patch antenna 200 may have a predetermined width of 0.8 mm or more and 2 mm or less.

Figure 5:
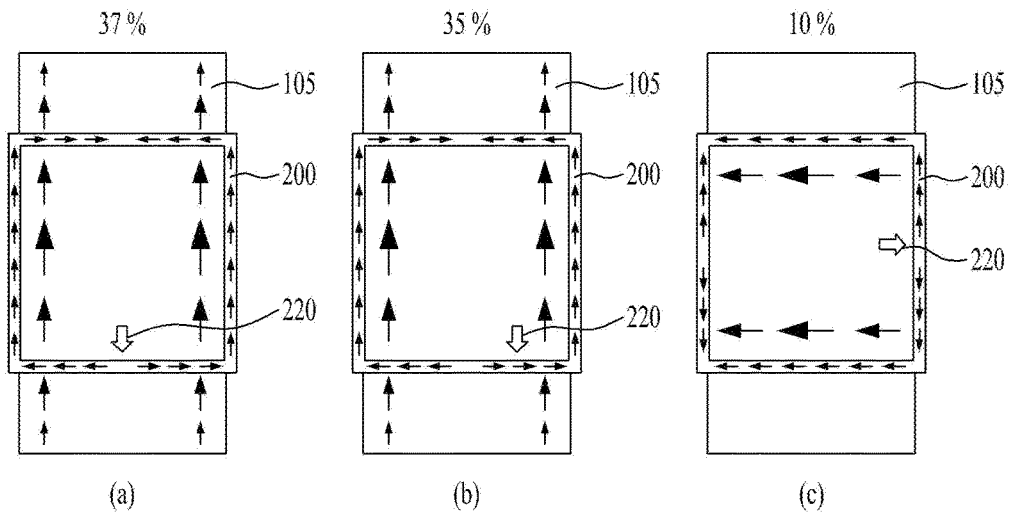
FIG. 5 is a diagram illustrating current flow in the ring patch antenna and the metal plate based on a position of a feeding portion.

FIG. 5 is a diagram illustrating current flow in the ring patch antenna 200 and the metal plate 105 based on a position of a feeding portion.

As shown in FIG. 5 (a), when the feeding portion 220 is connected to a horizontal point, the currents flow in a horizontal direction with respect to the connected point of the feeding portion 220 and in a vertical direction of the mobile terminal 100 in the third patch 203 and the fourth patch 204. As the current supplied by the feeding portion 220 is an alternating current, a direction of an arrow may be the reversed direction in the drawing.

The current flow of the ring patch antenna 200 may induce current flow in the ground 105 overlapped with the ring patch antenna 200. In other words, the current flow at the ground 105 may be along the vertical direction according to the current flow in the third patch 203 and the fourth patch 204 of the ring patch antenna 200. The current flow of the ground is the strongest at the overlapped area with the ring patch antenna 200 such that even the current flow at the other area may be influenced.

When the feeding portion 220 is located in a middle area of the second patch 202 (it will not mean right in the middle but some area spaced a preset distance apart from both ends), the current flow in the ground 105 may be in symmetry such that the effect of the antenna radiation performance gained by the ground 105 can be improved by 37%.

Here, when the feeding portion 220 is located at an edge of the connecting area between the second patch 204 and fourth patch 204 as shown in FIG. 5 (b), the current flow in the fourth patch 202 located close to the feeding portion 220 is likely to become strong enough to cause unbalance of the entire current flow. In this instance, the antenna radiation performance may be improved by 35%, which is lower than the performance gained in the embodiment of FIG. 3 (a).

When the feeding portion 220 is connected to the fourth patch 204 as shown in FIG. 5 (c), the current may flow in the first and second patches 201 and 202 along the second direction such that the current flow in the ground 105 may be changed into the second direction. At this time, the current may flow along the second direction that is perpendicular to the longitudinal direction of the ground 105 such that the improvement effect of the antenna performance gained by the ground 105 may decrease approximately by 10%.

The location of the feeding portion 220 connected to the ring patch antenna 200 may determine the direction of the current flow in the ring patch antenna 200 and the current flow in the ground 105 may be influenced. Accordingly, when the feeding portion 220 is arranged in the middle of the second patch 202 (or the first patch 201) to facilitate the current flow along the longitudinal direction of the ground 105, the most improved antenna performance may be gained.

Figure 6:
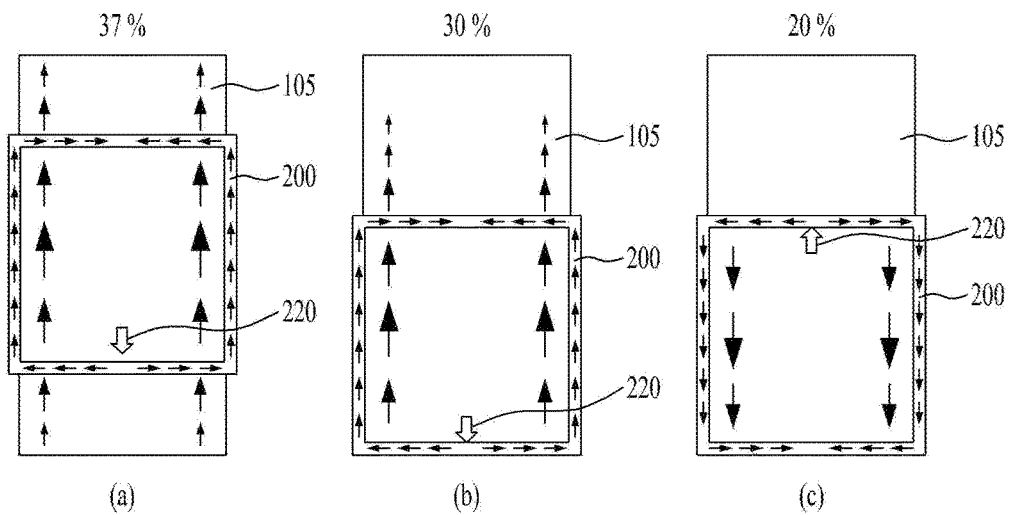
FIG. 6 is a diagram illustrating current flow in the ring patch antenna and the metal plate based on the positions of the ring patch antenna and feeding portion.

FIG. 6 is a diagram illustrating current flow in the ring patch antenna 200 and the metal plate 105 based on the positions of the ring patch antenna 200 and the feeding portion 220. Even when the feeding portion 220 is located in the first or second patch 201 or 202, the radiation performance may be different according to the position of the ring patch antenna 200.

When the ring patch antenna 200 is located aside towards the first direction as shown in FIG. 6 (b), the antenna radiation performance may be deteriorated compared with that of the ring patch antenna 200 located in the middle as shown I FIG. 6 (a). The current flow in the ground 105 is the strongest at the overlapped area with the ring patch antenna 200 and relatively weak at the other area distant from the overlapped area. Accordingly, when the ring patch antenna 200 is located aside towards the ground 105, the current flow in the ground 105 may become weak enough to deteriorate the antenna radiation performance.

Especially, when the feeding portion 220 of the ring patch antenna 200 is located in the middle of the ground 105 as shown in FIG. 6 (c), the current flow in the ground 105 is shown only in a lower area in the feeding portion 220 in the drawing such that the performance may be deteriorated more.

The ring patch according to the present disclosure may be located in the middle area of the ground 105. When the feeding portion 220 is located in the middle area of the second patch 202, the antenna radiation performance may be the best (the same result may be gained when the feeding portion 220 is located in the middle of the first patch 201).

Figure 7:
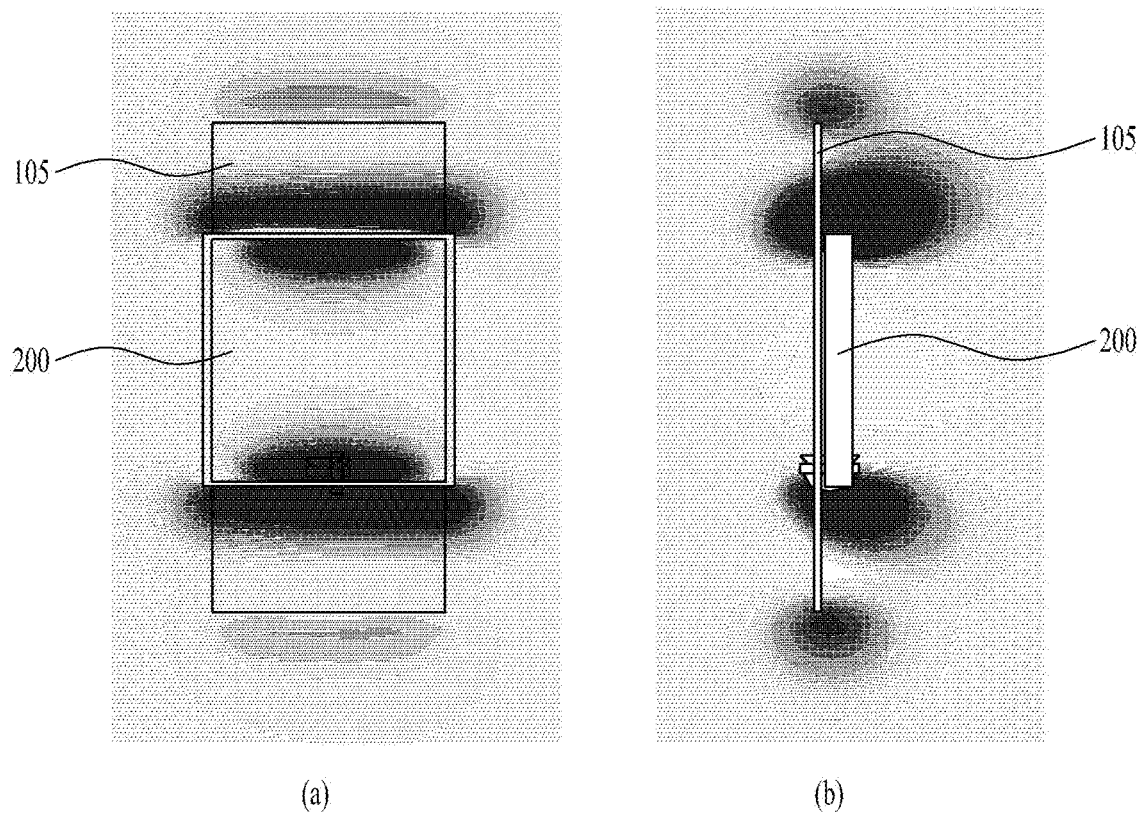
FIG. 7 is a diagram illustrating an electric field of a ring patch related with the present disclosure.

FIG. 7 is a diagram illustrating E-Field that is formed according to the current flow when the feeding portion 220 is connected to the second patch 202 such as FIG. 6 (a). The strongest E-Field is shown in an end of a conductor such that it may be shown in the first patch 201 and the second patch 202. The strongest E-Field may be shown in both ends of the ground 105.

FIGS. 8 and 9 are diagrams illustrating antenna performance based on the size of the ring patch antenna 200 according to the present disclosure. The total length of the ring patch antenna 200 may be the sum of the first to fourth patches 201 to 204 (2a+2b, see FIG. 2). The length of the ring patch antenna 200 may be corresponding to the wavelength of the resonance frequency. Accordingly, as the size of the ring patch antenna 200 becomes larger, the resonance frequency becomes lower. The antenna radiation efficiency may be the highest near the resonance frequency such that it is preferred that the signal desired to be transceived and the resonance frequency of the ring patch antenna 200 are matched.

When the length of the ring patch antenna 200 is 234 mm or less as shown in FIG. 8 (a), the resonance frequency may become 950 MHz (see FIG. 8 (b)). It is substantially a little shorter than the wavelength of 950 MHz in a vacuum state, which is different from the wavelength in the vacuum state by the effects of the dielectric permittivity of the case, the distance from the ground 105 and the matching circuit.

Referring to FIG. 8 (c), a line graph shows the antenna radiation performance of the antenna radiator and a bar graph shows the antenna performance when considering the effect of the peripheral components when applied to the products actually. It is shown that the efficiency rises at an area corresponding to the resonance frequency in the low frequency band.

When the length of the ring patch antenna 200 is 294 mm as shown in FIG. 9 (a), which is longer than the length shown in FIG. 6 (a), the resonance frequency decreases to 780 MHz and the highest efficiency in the low frequency band is 800 MHz, which is lower than what is shown in FIG. 9 (c). In other words, the length of the ring patch antenna 200 may be determined corresponding to the wavelength of the transceived signal frequency.

In addition, the ground 105 may also transceive a signal as the radiator such that it may have a predetermined first-direction length that is a half of the wavelength of the transceived signal to match the resonance frequency of the ground 105 with the frequency of the transceived signal. Considering the size of the mobile terminal recently released, the horizontal direction is shorter than a half of the wavelength of the low frequency band. Accordingly, the feeding portion 220 of the ring patch antenna 200 may be arranged to facilitate current flow in the ground along the vertical direction.

FIG. 10 is a diagram illustrating another embodiment of the ring patch antenna 200. The ring patch antenna 200 may be formed by attaching a conductive material to an inner surface of the rear case defining the rear surface of the mobile terminal or printing the conductive material. In addition, the ring patch antenna 200 may be extended further to right and left side surfaces of the mobile terminal 100 as shown in FIG. 10 (a). When the side case provided in the lateral surface of the body includes metal, a predetermined area of the side case 211, 212 may be connected to at least one of the third or fourth patch 203 or 204.

The ring patch antenna 200 extended to the lateral surfaces of the mobile terminal 100 has an effect of enlarging the width of the ring patch antenna 200 such that the antenna performance can be improved more. At this time, a distance g between the ring patch antenna 200 and the ground 105 may become reduced. However, considering the characteristics of the ring patch antenna, the ring patch antenna may be less affected by a peripheral conductor to have a performance that is not deteriorated a lot. Even if the distance g between the ring patch antenna 200 and the ground 105 is 1 mm or less, the performance of the ring patch antenna 200 can be secured and the size of the bezel arranged around the display unit can be then minimized.

As shown in FIG. 10 (b), the side case 210 defining an external design of the sides of the mobile terminal 100 may be used as some area of the ring patch antenna 200. The side case 210 may include a plurality of side members 211, 212, 213 and 214 including metal. A non-conductive material is filled in respective spaces (or slits 215, 216, 217 and 218) formed between each two of the side members 211, 212, 213 and 214 so as to form the side case 210.

Only the third and fourth side members 213 and 214 arranged in the upper and lower areas of the conventional mobile terminal 100 are used as the antenna. However, the first and the second side members 211 and 212 arranged in the right and left lateral surfaces may be additionally used to realize the ring patch antenna 200. The first side member 211 may replace the third patch 203 and the second side member 212 may replace the fourth patch 204.

Two of the slits 215, 216, 217 and 218 provided between the first through fourth members 211, 212, 213 and 214 may be formed in respective right and left lateral surfaces of the mobile terminal 100.

Figure 11:
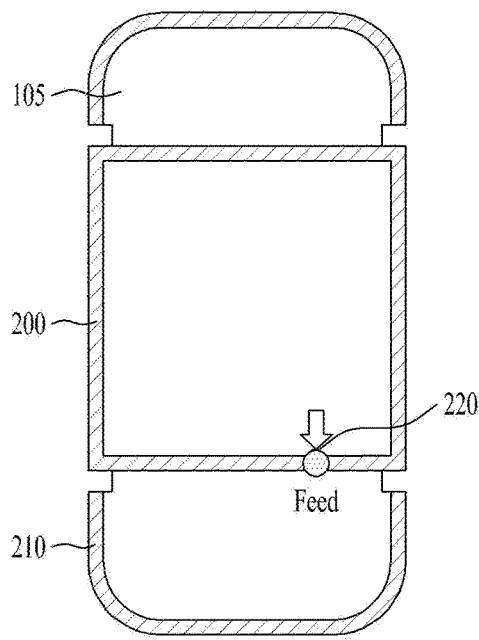
FIGS. 11 and 12 are diagrams illustrating antenna performance based on the size of the ring patch antenna according to the present disclosure.
Figure 12:
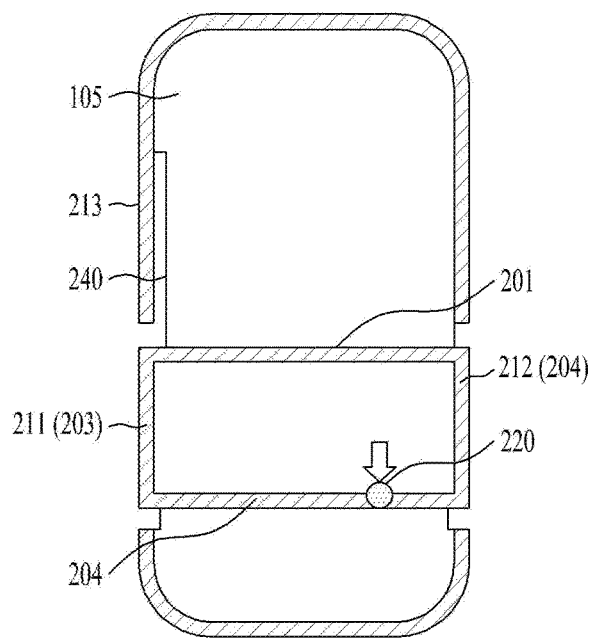

FIGS. 11 and 12 are diagrams illustrating antenna performance based on the size of the ring patch antenna 200 according to the present disclosure. As mentioned above, when the size of the ring patch antenna 200 is large, the resonance frequency matches the frequency (e.g., 0.9 GMz) of the transceived signal only to improve the transmission performance of the signal. While the user is not holding the mobile terminal in the hand (in other words, a free state), the transmission performance of the signal is −4.6 dB. As a negative value is getting larger, it means that the performance is deteriorated more.

In case a contact area with the hand is narrow when the user is using the mobile terminal 100 with holding it in the hand (PDA Hand), the transmission performance is −8.5~−8.6 dB. When holding the mobile terminal in the hand, the transmission performance is quite different in case of the right hand and the left hand. When the contact area with the hand is large (Wide Hand), the transmission performance is −10.5~−11.5 dB. When the user puts the mobile terminal on the head, the transmission performance is −10.5~11.5 dB. When the user puts the mobile terminal 100 on the hand and the head, the transmission performance is deteriorated to −20 dB.

When the ring patch size is reduced as shown in FIG. 12, the resonance frequency becomes high. A boosting slot 240 may be provided to match the resonance frequency with the transceived signal frequency. The boosting slot 240 may assist the performance of the ring patch antenna 200 as an antenna radiator configured to transceive the signal together with the ring patch antenna 200.

The boosting slot 240 may be realized as a slot having an open end after spacing the third side member 213 apart from one end to a ground portion. The boosting slot 240 may be arranged adjacent to the ring patch antenna 200, while spaced apart from the feeding portion 220, such that it can be easily affected by the flow of the currents supplied by the feeding portion 220. Accordingly, the third side member 213 arranged adjacent to the first patch that is the opposite direction of the second patch 202 may be used.

Even if the ring patch size is reduced, the additional structure of the boosting slot 240 may be used in improving the antenna performance. However, when the user is holding the mobile terminal in the hand or puts it on the body part, the performance is not so bad. But, when the user puts the mobile terminal on the head, the performance is likely to be deteriorated more in case of the reduced ring patch size than in case of the enlarged ring patch size.

Figure 14:
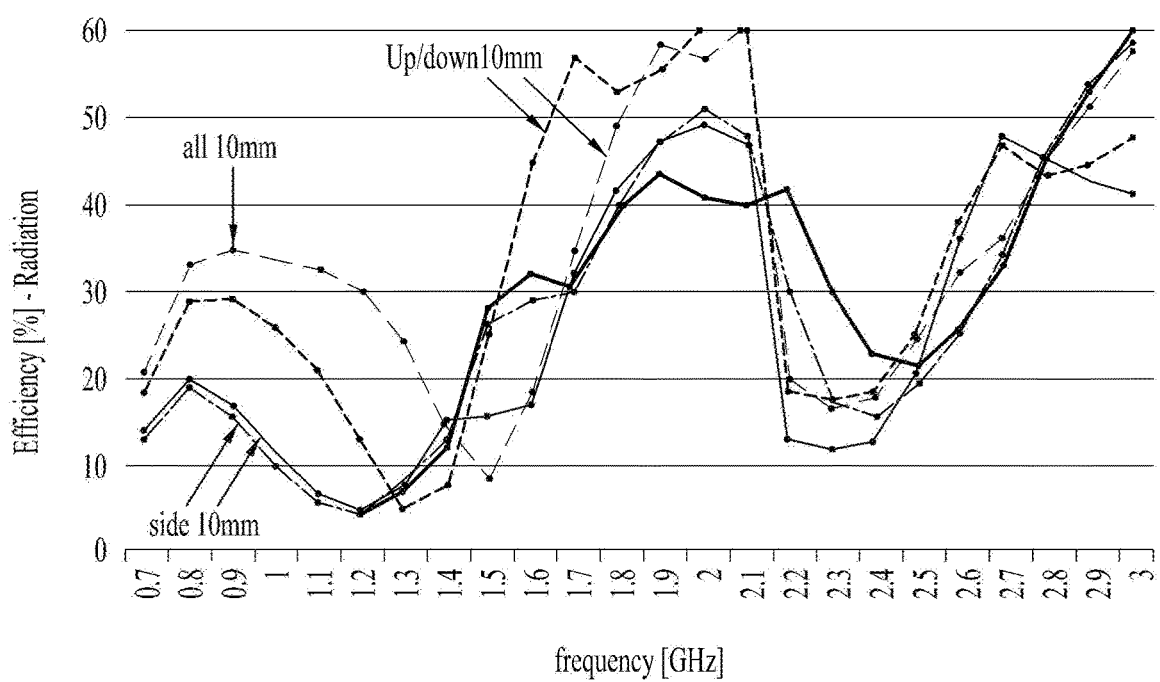

FIGS. 13 and 14 are diagrams to describe performance in case a coil antenna 230 is loaded in the ring patch antenna 200. The ring patch antenna 200 may be formed in the inner surface of the rear case or the side case 210 of the mobile terminal 100. Accordingly, it may be affected by a coil antenna attached to the rear case. The coil antenna 230 may include an antenna for short range wireless communication (e.g., NFC) and a charging coil for wireless charging.

The coil antenna 230 may be attached to the inner surface of the rear case and smaller than the ring patch antenna 200. Accordingly, the coil antenna 230 may be loaded in the ring patch antenna 200 as shown in FIG. 13 (a). The coil antenna 230 is likely to cause inference with the ring patch antenna 200 such that it may be preferred that the coil antenna is spaced a preset distance apart from the ring patch antenna 200. FIG. 13 (b) is a graph showing the performance according to a distance f between the ring patch antenna 200 and the coil antenna 230. When the distance between the coil antenna 230 and the ring patch antenna 200 is narrow, compared with when the coil antenna 230 is defaulted, the performance is deteriorated more. When the distance between them is 10 mm or more, a similar performance is gained in the low frequency band (e.g., 1 GHz or less) to the performance gained when no coil antenna 230 is provided.

If it is difficult to keep the distance of 10 mm or more between them in all directions, it is preferred that the distance in the direction affecting the performance most is the farthest. Referring to FIG. 14, the performance is shown in a state where the distance between the ring patch antenna 200 while the coil antenna is kept 10 mm only in a specific direction and the other distances in the other directions is 2 mm or less. When the distance is 10 mm in left and right directions, the performance is 25% or more in the low frequency band.

Referring to FIG. 7, upper and lower directions of the ring patch antenna 200 are ends of the current flow direction as the area where E-Field is integrated. If another conductive material is arranged near the upper or lower end, the E-Field of the ring patch antenna 200 is likely to be interfered with enough to deteriorate the performance.

If the installation space is restricted even with the more deteriorated performance than the distances in all directions are fart, it is preferred that the distance in an upper or lower direction is the farthest.

The mobile terminal 100 according to the present disclosure may transceive a signal in a low frequency band even if a bezel becomes small because of the enlarged display unit.

Furthermore, the mobile terminal 100 may using the middle area that is not used in receiving the antenna in the conventional mobile terminal, so as to expand the antenna installation space.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a body;
a ground loaded in the body and having a vertical length that is longer than a horizontal length;
a side case arranged around a circumference of the lateral surface of the body and comprising first and second side members provided in left and right lateral surfaces of the body and;
a first patch connecting one end of the first side member and one end of the second side member with each other;
a second patch connecting the other end of the first side member and the other end of the second side member with each other; and
a feeding portion connected to the second patch,
wherein the first side member, the second side member, the first patch and the second patch form a loop-shaped ring patch antenna.

2. The mobile terminal of claim 1, wherein the feeding portion is connected in a middle area of the second patch.

3. The mobile terminal of claim 1, wherein the side case comprises,
a third side member having one end facing one end of the first side case and the other end facing one end of the second side case;
a fourth side member having one end facing the other end of the first side case and the other end facing the other end of the second side case; and
first through fourth slits provided between the first through fourth side members and comprising a non-conductive material, respectively.

4. The mobile terminal of claim 3, wherein the third side member comprises a boosting slot spaced apart from the ground from one end to a ground portion.

5. The mobile terminal of claim 1, wherein the ring patch antenna is located in a middle area of the body in a vertical direction.

6. The mobile terminal of claim 1, wherein the vertical length of the ground is corresponding to a half of the wavelength of the resonance frequency of the ring patch antenna.

7. The mobile terminal of claim 1, wherein the length of the ring patch antenna is corresponding to the wavelength of the resonance frequency of the ring patch antenna.

8. The mobile terminal of claim 1, wherein the width of the ring patch antenna is 0.8 mm or more and 2 mm or less.

9. The mobile terminal of claim 1, further comprising:
a rear case provided to cover a rear surface of the body, wherein the first and second patches are attached to an inner surface of the rear case.

10. The mobile terminal of claim 1, wherein the ground comprises at least one of
a display unit disposed on a front surface of the body or a metal plate provided to support a rear surface of the display unit.

11. The mobile terminal of claim 1, wherein the respective first and second patches comprise a curved portion.

12. The mobile terminal of claim 1, further comprising:
a coil antenna provided in a rear surface of the case and surrounded by the ring patch antenna.

13. The mobile terminal of claim 12, wherein the first and second patches are spaced a distance of 10 mm or more apart from the coil antenna.

* * * * *